(12) United States Patent
Matsushima (10) Patent No.: US 10,139,684 B2
(45) Date of Patent: Nov. 27, 2018

(54) LIQUID CRYSTAL DISPLAY AND ELECTRONIC APPARATUS HAVING ELECTRODES WITH OPENINGS THEREIN

(71) Applicant: Japan Display Inc., Tokyo (JP)

(72) Inventor: Toshiharu Matsushima, Tottori (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/078,200

(22) Filed: Mar. 23, 2016

(65) Prior Publication Data

US 2016/0202574 A1 Jul. 14, 2016

Related U.S. Application Data (63) Continuation of application No. 13/271,479, filed on Oct. 12, 2011, now Pat. No. 9,323,112.

(51) Int. Cl.
  *G02F 1/1343* (2006.01)
  *G02F 1/1362* (2006.01)
  *G02F 1/1368* (2006.01)

(52) U.S. Cl.
  CPC ...... *G02F 1/134309* (2013.01); *G02F 1/1368* (2013.01); *G02F 1/136286* (2013.01); *G02F 2001/134372* (2013.01)

(58) Field of Classification Search
  CPC combination set(s) only.
  See application file for complete search history.

(56) References Cited

U.S. PATENT DOCUMENTS

| | | | |
|---|---|---|---|
| 6,028,653 A | 2/2000 | Nishida | |
| 2002/0033922 A1 | 3/2002 | Hidehira et al. | |
| 2007/0024789 A1* | 2/2007 | Itou | G02F 1/134363 349/139 |
| 2007/0171319 A1 | 7/2007 | Fujita et al. | |
| 2008/0100787 A1 | 5/2008 | Segawa et al. | |
| 2008/0186440 A1* | 8/2008 | Lim | G02F 1/134363 349/141 |
| 2008/0284965 A1 | 11/2008 | Ryu et al. | |
| 2011/0050672 A1 | 3/2011 | Choi | |

FOREIGN PATENT DOCUMENTS

| | | |
|---|---|---|
| JP | 2007-226175 | 9/2007 |
| JP | 2008-116484 | 5/2008 |

* cited by examiner

*Primary Examiner* — Lauren Nguyen
(74) *Attorney, Agent, or Firm* — K&L Gates LLP (57) ABSTRACT

A liquid crystal device includes a pair of substrates composed of an element substrate and a counter substrate and a liquid crystal layer that is held between the pair of substrates. In the liquid crystal device, a data line and a scanning line are provided on the element substrate in a manner to be orthogonal to each other, a plurality of pixels including a switching element are arranged in matrix, a first electrode and a second electrode are provided on the element substrate, an image signal potential is supplied to the first electrode via the switching element, a common potential is supplied to the second electrode, the second electrode includes a plurality of openings, and a width, in an alignment direction of the plurality of openings, of the opening positioned on an outermost side in the alignment direction is smaller than a width of the rest of the openings.

8 Claims, 11 Drawing Sheets

LIQUID CRYSTAL DISPLAY AND ELECTRONIC APPARATUS HAVING ELECTRODES WITH OPENINGS THEREIN

CROSS REFERENCES TO RELATED APPLICATIONS

The present application is a continuation of U.S. patent application Ser. No. 13/271,479, filed Oct. 12, 2011, which application contains subject matter related to that disclosed in Japanese Priority Patent Application JP 2009-089792 filed in the Japan Patent Office on Apr. 2, 2009, the entire contents of which are hereby incorporated by reference.

BACKGROUND

The present application relates to a liquid crystal device and an electronic apparatus.

Examples of liquid crystal display devices employing a lateral electric field mode include an in-plane switching (IPS) mode liquid crystal display device, a fringe field switching (FFS) mode liquid crystal display device, and the like. In the IPS mode liquid crystal display device, a pixel electrode and a common electrode which generate a lateral electric field are formed on the same layer and an electric field (that is, a lateral electric field) is generated in a liquid crystal layer in an approximately parallel direction to a substrate surface. Accordingly, visibility in the IPS mode liquid crystal display device can be advantageously improved compared to a twisted nematic (TN) mode liquid crystal display device which is one of liquid crystal display devices of a vertical electric field mode. However, there is a disadvantage that it is difficult to sufficiently drive liquid crystal molecules positioned directly on the pixel electrode, causing degradation of light transmission.

On the other hand, in the FFS mode liquid crystal display device, a pixel electrode and a common electrode are formed on different layers with an insulation layer interposed and thus a direction of an electric field generated in a liquid crystal layer is different from that of the IPS mode liquid crystal display device. Therefore, the electric field is applied to liquid crystal molecules positioned directly on the pixel electrode as well and thereby the liquid crystal molecules on this part can be sufficiently driven. As a result, light transmission can be advantageously improved in the FFS mode liquid crystal display device more than the IPS mode liquid crystal display device described above. Especially, Japanese Unexamined Patent Application Publication No. 2007-226175 discloses a liquid crystal device in which an insulation film for planarization is formed on a lower layer side of two electrodes which generate a lateral electric field in the FFS mode. Further, an electrode provided on an upper layer side has a shape including a plurality of long and thin openings (slits) in the FFS mode liquid crystal device. Japanese Unexamined Patent Application Publication No. 2008-116484 discloses a liquid crystal device in which a relationship between the width on an electrode portion positioned between openings and the width of the openings are optimized so as to improve display quality.

SUMMARY

In Japanese Unexamined Patent Application Publication No. 2008-116484, for example, the most preferable dimensions of the width of the electrode portion and the width of the opening are obtained from a relationship between a driving voltage and the maximum transmittance. However, the inventor found that unevenness in brightness arose in a pixel even if these dimensions were merely optimized. The unevenness in brightness in a pixel eventually results in degradation of light transmittance. Therefore, in the configuration of the related art, a property, in which light transmittance can be improved and brighter display can be obtained, of one of properties of the FFS mode could not have been sufficiently utilized.

It is desirable to provide a liquid crystal device in which evenness in brightness in a pixel can be realized and light transmittance is improved so as to be able to obtain bright display, and an electronic apparatus provided with the liquid crystal device.

According to an embodiment, there is provided a liquid crystal device including a pair of substrates composed of an element substrate and a counter substrate, and a liquid crystal layer that is held between the pair of substrates. In the liquid crystal device, a data line and a scanning line are provided on the element substrate in a manner to be orthogonal to each other, a plurality of pixels including a switching element that is electrically connected to the data line and the scanning line are arranged in matrix, a first electrode and a second electrode that applies an electric field generated between the second electrode and the first electrode to the liquid crystal layer are provided on the element substrate, an image signal potential from the data line is supplied to the first electrode via the switching element, a common potential is supplied to the second electrode, the second electrode includes a plurality of openings that extend in directions parallel with each other, and among the plurality of openings, a width, in an alignment direction of the plurality of openings, of the opening positioned on an outermost side in the alignment direction is smaller than a width, in the alignment direction, of the rest of the openings.

The liquid crystal device according to the embodiment is so-called an FFS mode liquid crystal device which is provided with the first electrode and the second electrode that applies an electric field generated between the second electrode and the first electrode to the liquid crystal layer, on the element substrate thereof. The inventor found that in a case of an FFS mode liquid crystal device of the related art in which the widths of a plurality of openings of a second electrode (upper layer side electrode) are same as each other, a lateral electric field component was more intensely generated in an edge part of the opening positioned on the outermost side than other part and light transmittance in the outermost part was increased to be unbalanced with respect to other part, causing unevenness in brightness. Then, the inventor found that evenness of transmittance with respect to other part was improved and unevenness of brightness in a pixel could be reduced by setting the width, in the alignment direction, of the opening positioned on the outermost side to be smaller than the width, in the alignment direction, of other openings. Details will be described later.

In the liquid crystal device according to the embodiment, it is preferable that when the width, in the alignment direction, of the opening positioned on the outermost side is set to be S1 [μm] and the width, in the alignment direction, of the rest of the openings is set to be S2 [μm], S2−S1≥0.5 be satisfied.

This configuration enables stable manufacturing in an actual manufacturing process and can securely provide advantageous effects of the embodiment.

According to another embodiment, there is provided a liquid crystal device including a pair of substrates composed of an element substrate and a counter substrate, and a liquid crystal layer that is held between the pair of substrates. In the liquid crystal device, a data line and a scanning line are provided on the element substrate in a manner to be orthogonal to each other, a plurality of pixels including a switching element that is electrically connected to the data line and the scanning line are arranged in matrix, a first electrode and a second electrode that applies an electric field generated between the second electrode and the first electrode to the liquid crystal layer are provided on the element substrate, a common potential is supplied to the first electrode, an image signal potential from the data line is supplied to the second electrode via the switching element, the second electrode includes a plurality of openings that extend in directions parallel with each other, and among a plurality of electrode parts adjacent to the openings, a width, in an alignment direction of the plurality of electrode parts, of the electrode part positioned on an outermost side in the alignment direction is smaller than a width, in the alignment direction, of the rest of the electrode parts.

In the liquid crystal device according to the other embodiment, a positional relationship of an electrode (that is, a pixel electrode), to which an image signal potential from the data line is supplied, and an electrode (that is, a common electrode), to which a common potential is supplied, with the insulation film interposed is opposite to the relationship in the liquid crystal device of the embodiment described first. In the liquid crystal device of the embodiment described first in which the common electrode is disposed on the upper layer side and the pixel electrode is disposed on the lower layer side, an advantageous effect of the embodiment is described by using "the width of the opening". In the liquid crystal device of the other embodiment in which the pixel electrode is disposed on the upper layer side and the common electrode is disposed on the lower layer side, it is conceivable that "the width of the electrode part" is equivalent to "the width of the opening" in the liquid crystal device of the embodiment described first. Accordingly, in the liquid crystal device of the other embodiment, unevenness of brightness in a pixel can be reduced by setting the width of the electrode part positioned on the outermost side to be smaller than the width of the rest of the electrode parts.

In the liquid crystal device according to the embodiment, it is preferable that when the width, in the alignment direction, of the electrode part positioned on the outermost side is set to be L1 [μm] and the width, in the alignment direction, of the rest of the electrode parts is set to be L2 [μm], L2-L1≥0.5 be satisfied.

This configuration enables stable manufacturing in an actual manufacturing process and can securely provide advantageous effects of the embodiment.

According to still another embodiment, there is provided an electronic apparatus including the liquid crystal device of the embodiments described above as a display unit.

According to the embodiment, the electronic apparatus includes the liquid crystal device of the embodiments described above, so that the electronic apparatus including a bright liquid crystal display unit can be provided.

Additional features and advantages are described herein, and will be apparent from the following Detailed Description and the figures.

DETAILED DESCRIPTION

Embodiments of the present application will be described below in detail with reference to the drawings.

An embodiment will be described with reference to FIGS. 1 to 11.

A liquid crystal device according to the embodiment is an example of a transmission type liquid crystal display device of the FFS mode.

In FIGS. 1 to 11, scales of respective layers and respective members are adequately changed in the extent that they can be recognized in the drawings.

Figure 1:
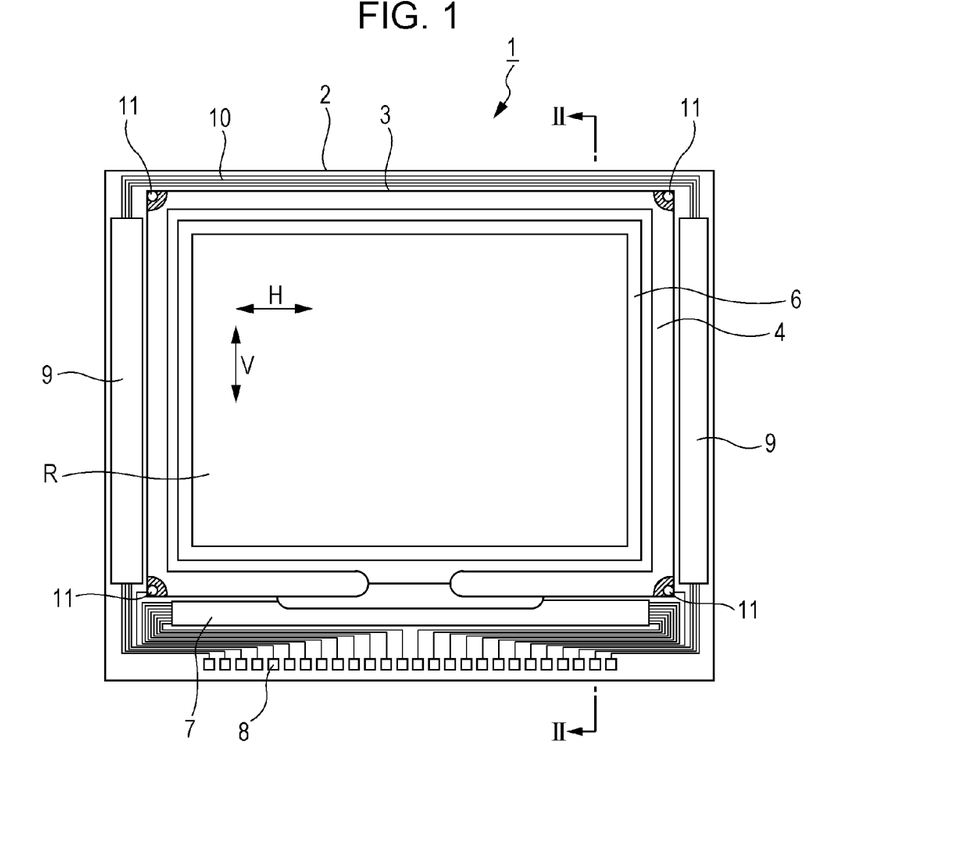
FIG. 1 is a plan view showing a liquid crystal device according to an embodiment.
Figure 2:
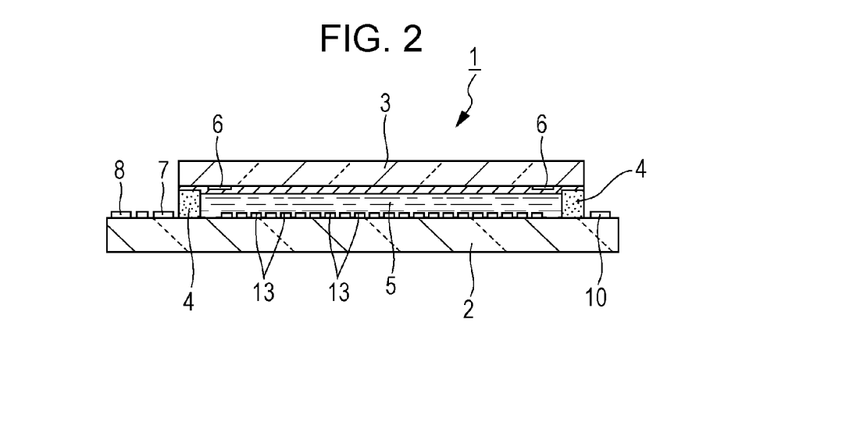
FIG. 2 is a sectional view taken along II-II line of FIG. 1.

As shown in FIGS. 1 and 2, in a liquid crystal device 1 according to the embodiment, a thin film transistor (abbreviated below as a TFT) array substrate 2 and a counter substrate 3 are bonded to each other by a sealing member 4 and a liquid crystal layer 5 is sealed in a region partitioned by the sealing member 4. The liquid crystal layer 5 is made of a liquid crystal material having positive dielectric anisotropy. In a region in the inside of a forming region of the sealing member 4, a light shielding film (a peripheral break line) 6 which is made of a light shielding material is formed. In a peripheral circuit region on the outside of the sealing member 4, a data line driving circuit 7 and an external circuit mounting terminal 8 are formed along one side of the TFT array substrate 2, and scanning line driving circuits 9 are formed respectively along two sides which are adjacent to the above-mentioned one side. On the rest side of the TFT array substrate 2, a plurality of wirings 10 for connecting the scanning line driving circuits 9 formed on both sides of a display region R are provided. On corners of the counter substrate 3, inter-substrate conducting members 11 for electrically conducting the TFT array substrate 2 and the counter substrate 3 are provided.

A horizontal direction of the display region R is expressed by an arrow H and a vertical direction of the display region R is expressed by an arrow V. The horizontal direction H is a direction along one side (a side in a lateral direction in FIG. 1) of the display region R having a rectangular shape and the vertical direction V is a direction along one side (a side in a longitudinal direction in FIG. 1) adjacent to the one side.

Figure 3:
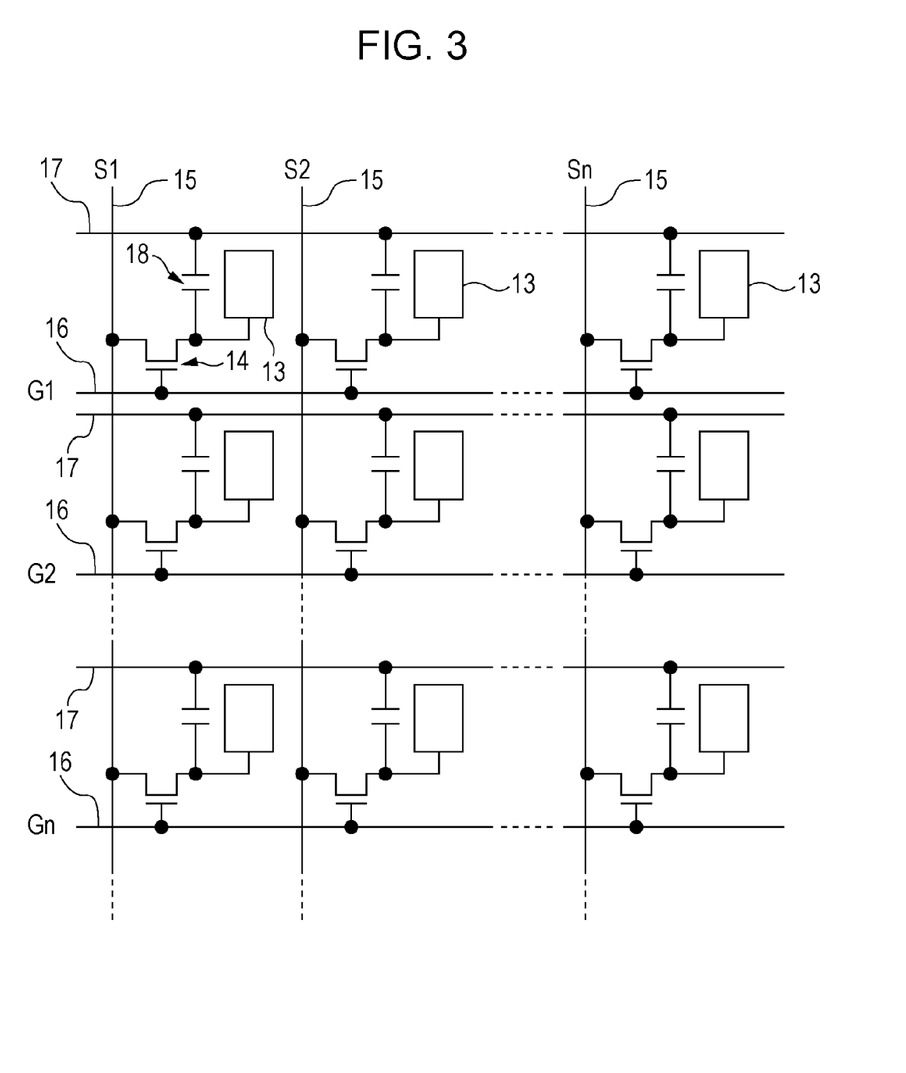
FIG. 3 is an equivalent circuit diagram of the liquid crystal device.

In a plurality of pixels which are arranged in matrix so as to constitute the display region of the liquid crystal device 1 of the embodiment, pixel electrodes 13 are respectively formed, as shown in FIG. 3. Further, on a lateral side of the pixel electrode 13, a TFT 14 which is a pixel switching element for performing conduction control to this pixel electrode 13 is formed. To sources of the TFTs 14, data lines 15 are electrically connected. To the data lines 15, image signals S1, S2, . . . , Sn are respectively supplied. The image signals S1, S2, . . . , Sn may be supplied to respective data lines 15 in a line order as this order or may be supplied to the plurality of data lines 15 which are adjacent to each other, in a group unit.

Further, to gates of the TFTs 14, scanning lines 16 are electrically connected. To the scanning lines 16, scanning signals G1, G2, . . . , Gm are respectively supplied in a pulse mode at predetermined timing. Here, the scanning signals G1, G2, . . . , Gm are applied to respective scanning lines 16 in a line order as this order. To drains of the TFTs 14, the pixel electrodes 13 are electrically connected. When certain TFTs 14 which are switching elements are turned on in a predetermined period of time by the scanning signals G1, G2, . . . , Gm which are supplied from the scanning lines 16, the image signals S1, S2, . . . , Sn which are supplied from the data lines 15 are written in liquid crystal of respective pixels through the TFTs 14 at predetermined timing.

The image signals S1, S2, . . . , Sn which are written in the liquid crystal and have a predetermined level are held in liquid crystal capacitors which are formed between the pixel electrodes 13 and a common electrode to which a common potential is applied, in a predetermined period of time. Here, in order to prevent a leak of the image signals S1, S2, . . . , Sn which are held, a storage capacitor 18 is formed between the pixel electrode 13 and a capacity wiring 17 so as to be disposed in parallel with the liquid crystal capacitor. Thus, if a voltage signal is applied to the liquid crystal, an alignment state of the liquid crystal molecules is changed depending on a level of a voltage which is applied. Accordingly, light incident on the liquid crystal is modulated and gradation display is performed.

The pixel configuration of the liquid crystal device 1 of the embodiment is now described with reference to FIGS. 4 and 5.

In the liquid crystal device 1 of the embodiment, one pixel constituting an image is composed of three pieces of sub pixels of red (R), green (G), and blue (B). Here, FIG. 4 shows four pieces of sub pixels including two sub pixels aligned in an extending direction of the data line 15 (vertical direction of FIG. 4) and two sub pixels aligned in an extending direction of the scanning line 16 (horizontal direction in FIG. 4). Here, an electrode allocated for each sub pixel is called a "pixel electrode" in this specification, so that a part which principally corresponds to a "sub pixel" is sometimes called a "pixel" depending on configuration elements.

The planar configuration of each sub pixel is first described.

Figure 4:
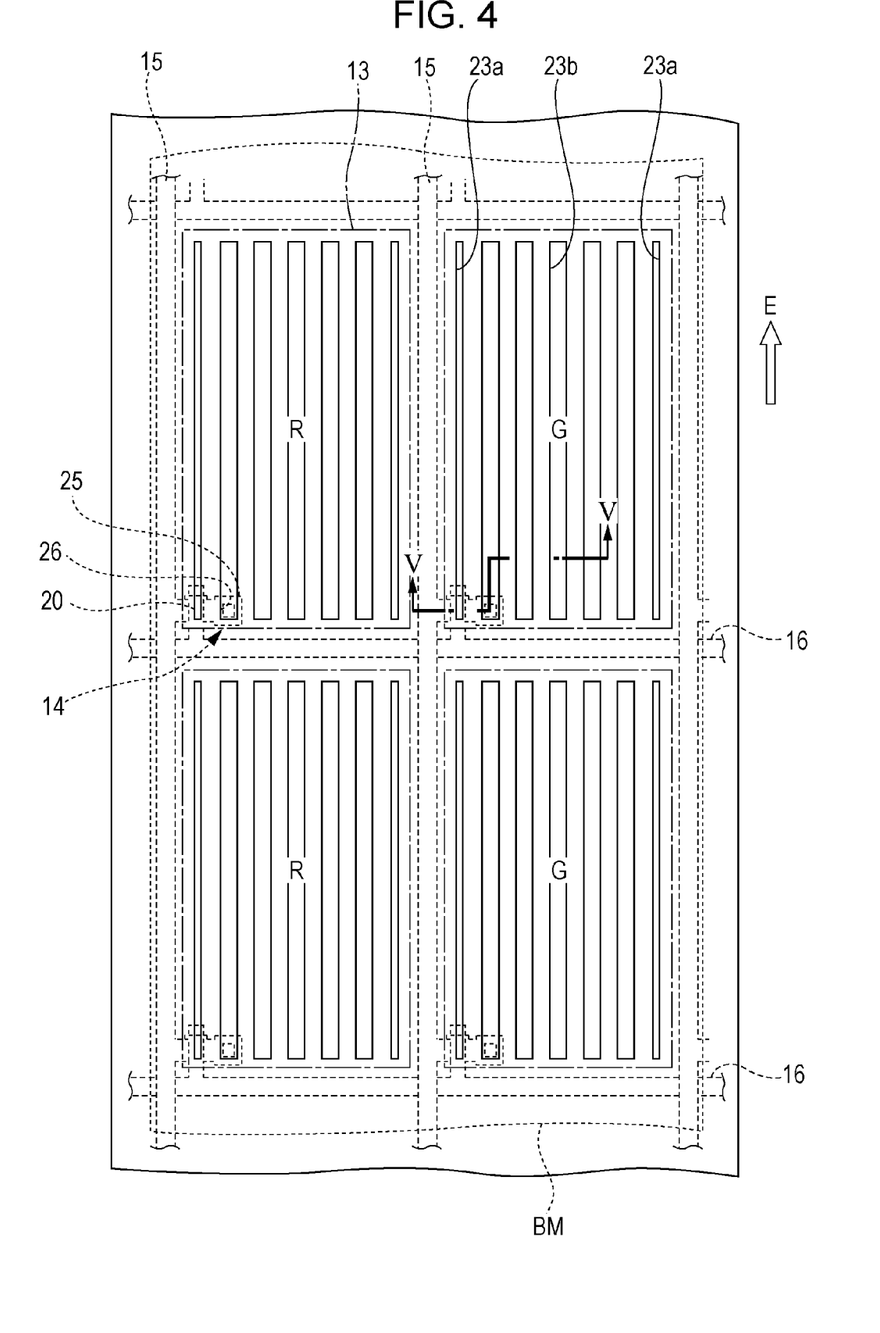
FIG. 4 is a plan view of a pixel constituting a display unit of the liquid crystal device.

As shown in FIG. 4, a plurality of data lines 15 are disposed with a predetermined interval, and a plurality of scanning lines 16 are disposed with a predetermined interval so as to be orthogonal to the data lines 15, on the TFT array substrate 2. A region surrounded by adjacent two data lines 15 and adjacent two scanning lines 16 is a sub pixel region. On a corner of each sub pixel region (a corner on the lower left of each sub pixel region in FIG. 4), the TFT 14 is disposed. The TFT 14 of the embodiment is a low-temperature poly-Si TFT including a semiconductor layer 20 made of polycrystalline silicon which is formed in a low-temperature process, for example. On the semiconductor layer 20, a part protruded from the data line 15 which functions as a source electrode and a drain electrode 25 are disposed so as to be partially superposed to each other.

In the embodiment, a common potential is supplied to a common electrode in all sub pixels, so that a solid-type common electrode covering all sub pixels is provided. Here, the common electrode may be provided in a divided manner for every sub pixel. As described later, the pixel electrode 13 is disposed on a lower layer side and a common electrode 21 is disposed on an upper layer side. In the inside of each sub pixel region, the pixel electrode 13 having an approximate rectangular shape is provided. On the common electrode 21 inside each sub pixel region, a plurality of openings 23a and 23b which extend in approximately parallel with the extending direction of the data line are formed. A reference numeral 25 denotes a drain electrode for connecting a drain region of the semiconductor layer and the pixel electrode, and a reference numeral 26 denotes a drain contact hole.

The sectional configuration is now described.

Figure 5:
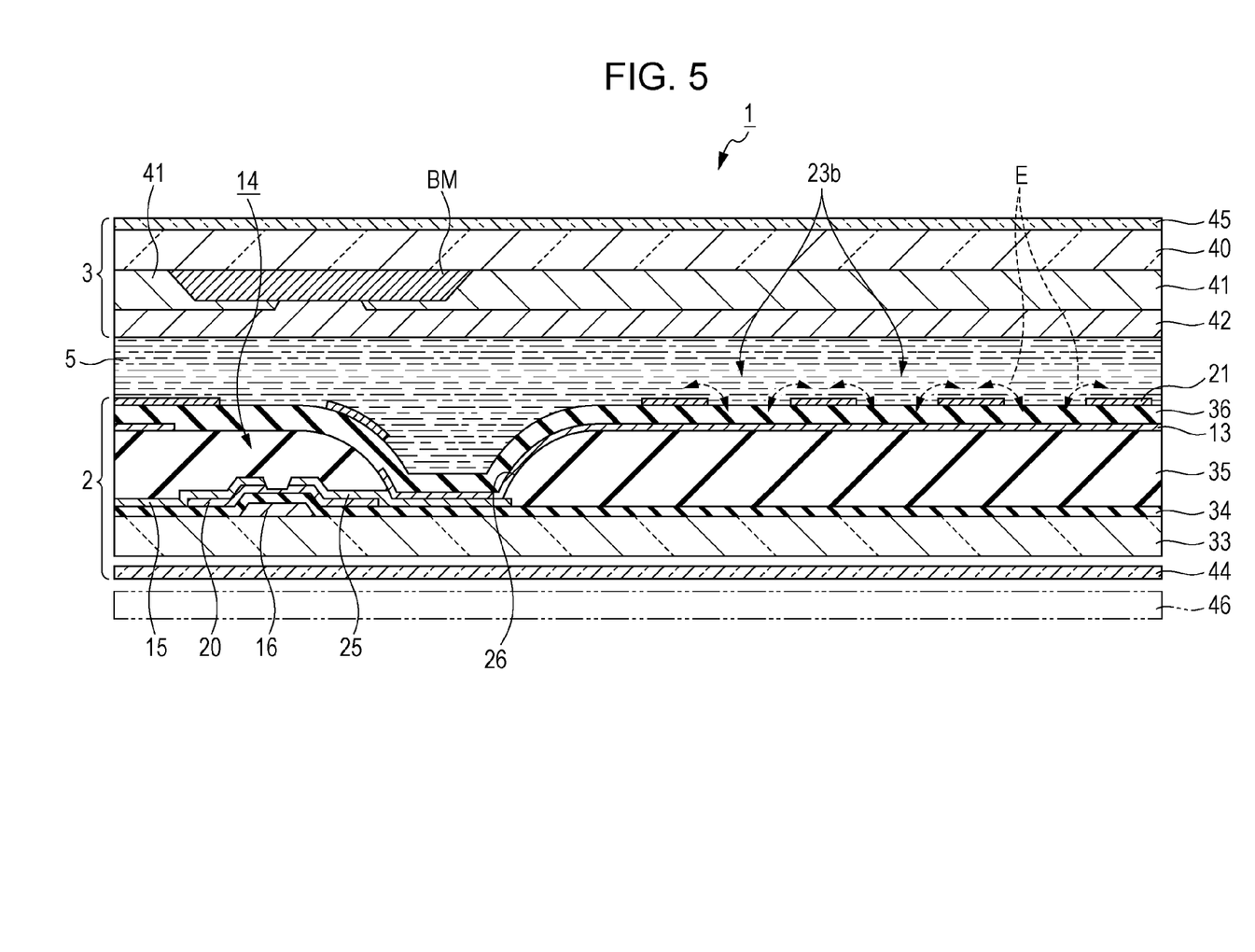
FIG. 5 is a sectional view taken along V-V line of FIG. 4.

As shown in FIG. 5, in the TFT array substrate 2, the scanning line 16 is formed on an upper surface of a substrate body 33 which is made of glass or the like and a part, which is below a channel region of the semiconductor layer 20, of the scanning line 16 functions as a gate electrode as it is. A gate insulation film 34 which is made of a silicone oxide film or the like, for example, is formed on the whole surface of the substrate body 33 so as to cover the scanning line 16. The semiconductor layer 20 is formed on a part of the gate insulation film 34, and the data line 15 is formed so as to contact with a source region of the semiconductor layer 20. A part of the data line 15, shown in FIG. 4, which is protruded in a manner to be superposed on the semiconductor layer 20 in a plane fashion functions as a source electrode. The drain electrode 25 is formed to contact with a drain region of the semiconductor layer 20. A first interlayer insulation film 35 which is made of a silicon oxide film, for example, is formed on the whole surface of the gate insulation film 34 so as to cover these configuration elements of the TFT 14.

The pixel electrode 13 is formed on the first interlayer insulation film 35 and is electrically connected with the drain electrode 25 through the drain contact hole 26 which penetrates the first interlayer insulation film 35. Due to this configuration, the pixel electrode 13 is electrically connected with the drain region of the semiconductor layer 20 of the TFT 14 through the drain electrode 25. A second interlayer insulation film 36 which is made of a silicon oxide film, a silicon nitride film, or the like, for example, is formed on the whole surface of the first interlayer insulation film 35 so as to cover the pixel electrode 13. On the second interlayer insulation film 36, the common electrode 21 is formed. On the common electrode 21, an alignment film (not shown) on which rubbing processing is performed is formed.

On the other hand, in the counter substrate 3, coloring layers 41 of R, G, and B which constitute a color filter are formed on a lower surface of a substrate body 40 which is made of glass or the like, and a black matrix BM (light shielding layer) is formed on a region overlapping with the TFT 14, the data line 15, the scanning line 16, and the like. An overcoat layer 42 which serves as a protection film of the color filter is formed to cover the coloring layers 41 and the black matrix BM, and an alignment film (not shown) on which rubbing processing is performed is formed on the overcoat layer 42.

A liquid crystal layer 5 is sandwiched and held between the TFT array substrate 2 and the counter substrate 3 described above. On outer surface sides of the TFT array substrate 2 and the counter substrate 3, polarization plates 44 and 45 are respectively formed. Outside the polarization plate 44 disposed on the TFT array substrate 2 side, a back light 46 (illuminating device) is provided.

Figure 6:
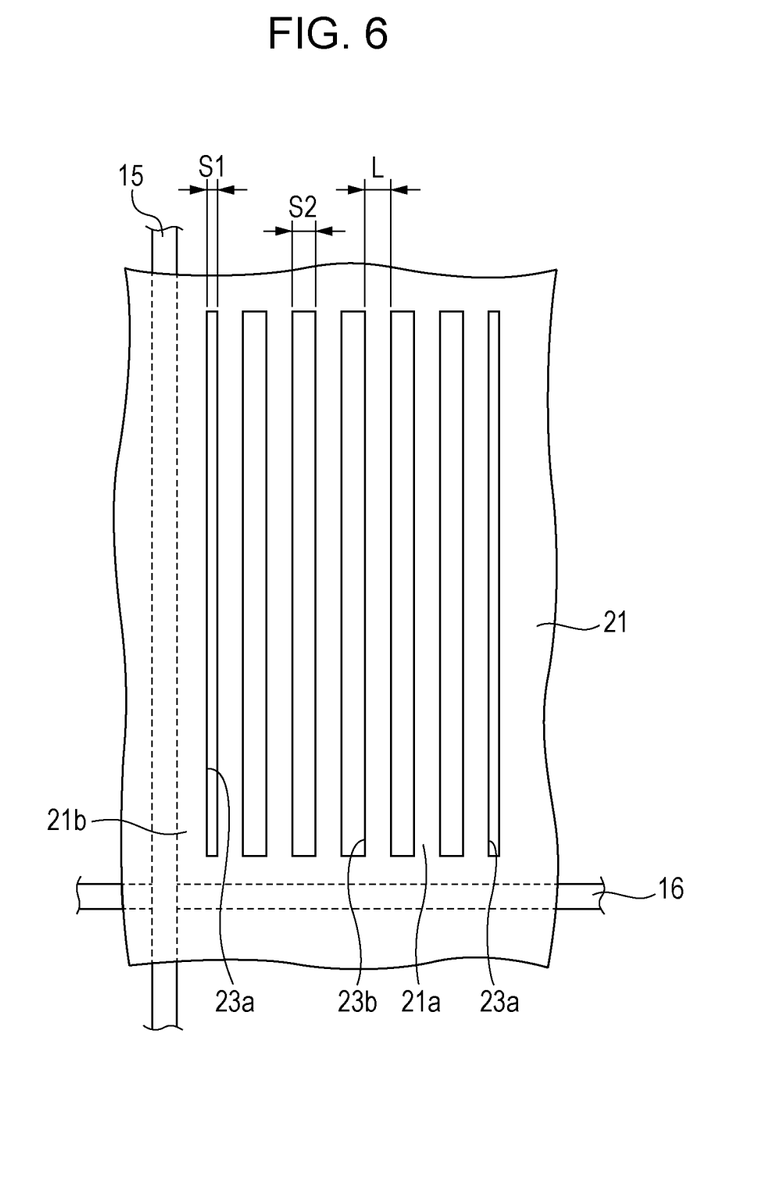
FIG. 6 is a plan view showing a part of a common electrode corresponding to one pixel.

FIG. 6 is a plan view showing a part of the common electrode 21 corresponding to one sub pixel. The TFT 14 is not shown in FIG. 6. As described above, a plurality of long and thin openings 23a and 23b are formed in the common electrode 21 in each sub pixel region in the extending direction of the scanning line 16 with the predetermined interval. Further, each of the openings 23a and 23b extends in approximately parallel with the extending direction of the data line 15, and the plurality of openings 23a and 23b are arranged so as to be approximately parallel with each other. Among the plurality of openings 23a and 23b, the width (dimension in a short-side direction) of the opening 23a which is positioned on the outermost side in the alignment direction of the openings (the extending direction of the scanning line 16) is set to be smaller than the width (dimension in a short-side direction) of the alignment direction of the openings 23b other than the opening 23a. Hereinafter, "the width in the alignment direction of the openings (or electrode parts)" is referred to as merely "the width of the openings (or the electrode parts)".

In this embodiment, when the width of the opening 23a positioned on the outermost side is set to be S1 [μm] and the width of the openings 23b other than the opening 23a is set to be S2 [μm], S2−S1≥0.5 is satisfied. Specifically, the width S1 of the opening 23a positioned on the outermost part is 4 μm and the width S2 of the openings 23b other than the opening 23a is 4.5 μm, for example. Further, the width L of the electrode part 21a positioned between adjacent two openings 23a and 23b is 3.5 μm.

In the FFS mode liquid crystal device, regions in which potential change is large are concentrated on the TFT array substrate side compared to the counter substrate side in the liquid crystal layer. This is different from the IPS mode liquid crystal device even though both of these liquid crystal devices employ the mode in which liquid crystal is driven by a lateral electric field. The upper and lower asymmetric property of this potential distribution is considered in optimization of parameters such as a pitch of an opening (slit) of the second electrode (upper layer side electrode), the thickness of a dielectric film between the second electrode and the first electrode (lower layer side electrode), the thickness of the liquid crystal layer, and the thickness of the alignment film provided on the second electrode. However, the inventor focused attention on a point that there also was a characteristic, which was not exhibited in the IPS mode liquid crystal device and had not been taken into consideration in the related art, in potential distribution around the opening which was positioned on the outermost part of a sub pixel.

Figure 7:
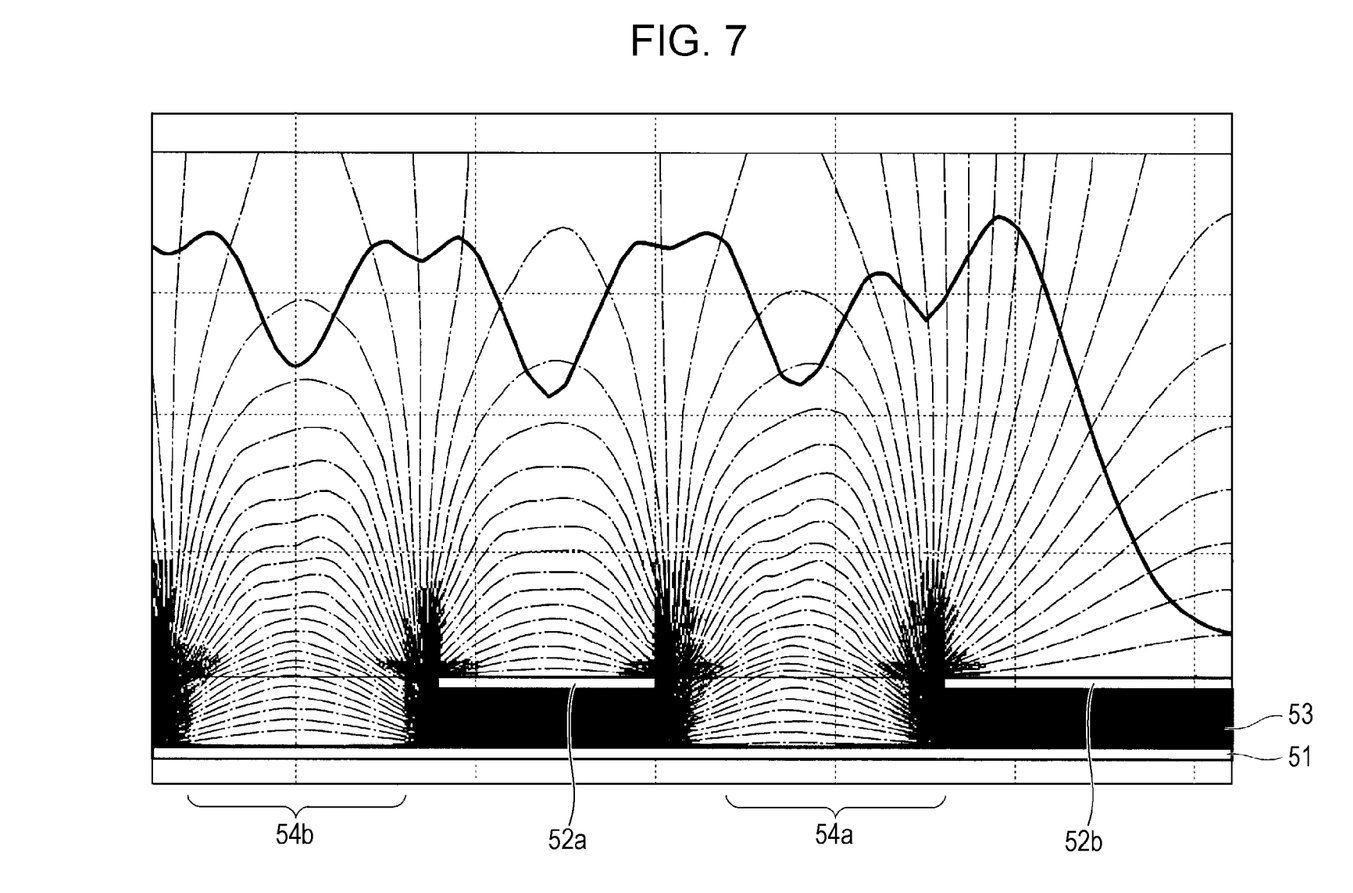
FIG. 7 illustrates equipotential lines and distribution of light transmittance in electric field applying in an FFS system.

Therefore, the inventor obtained potential distribution in a liquid crystal layer and transmittance distribution in the FFS mode electrode configuration through simulation. The simulation result is shown in FIG. 7. In FIG. 7, an equipotential line is expressed by a dashed-dotted line and transmittance distribution is expressed by a solid line. A reference character 51 denotes a first electrode, reference characters 52a and 52b denote second electrodes, and a reference character 53 denotes a dielectric body. In the embodiment, the first electrode 51 corresponds to the pixel electrode 13, the second electrodes 52a and 52b correspond to the common electrodes 21a and 21b, and the dielectric body 53 corresponds to a third interlayer insulation film 37. A part denoted by a reference character 54a is the opening positioned on the outermost part of the sub pixel, and a part on the right side of the opening 54a is a part 52b in which the second electrode long extends. Further, in this simulation, the widths of all of openings 54a and 54b were set to be equal to each other.

From the result of FIG. 7, it is understood that equipotential lines show approximately same shapes on the center side of the sub pixel (left side from the center of FIG. 7), while equipotential lines rapidly stand up in the longitudinal direction near an outer edge of the opening 54a positioned on the outermost part and thus a lateral electric field component is strong. In the lateral electric field mode, as the lateral electric field component becomes strong, the light transmittance tends to become higher. Therefore, the light transmittance changes in approximately constant cycle on the central side of the sub pixel, but the light transmittance exhibits a high peak near the outer edge of the opening 54a positioned on the outermost part. Accordingly, it was understood that when the widths of the openings were set to be equal to each other, brightness became uneven in the sub pixel as this simulation. The unevenness of the brightness show that even if a voltage applied to the liquid crystal layer is changed, it is difficult to adjust the brightness and therefore bright display is not obtained. Accordingly, the inventor conceived that the width of the opening positioned on the outermost part was set to be smaller than that of other openings.

Figure 8:
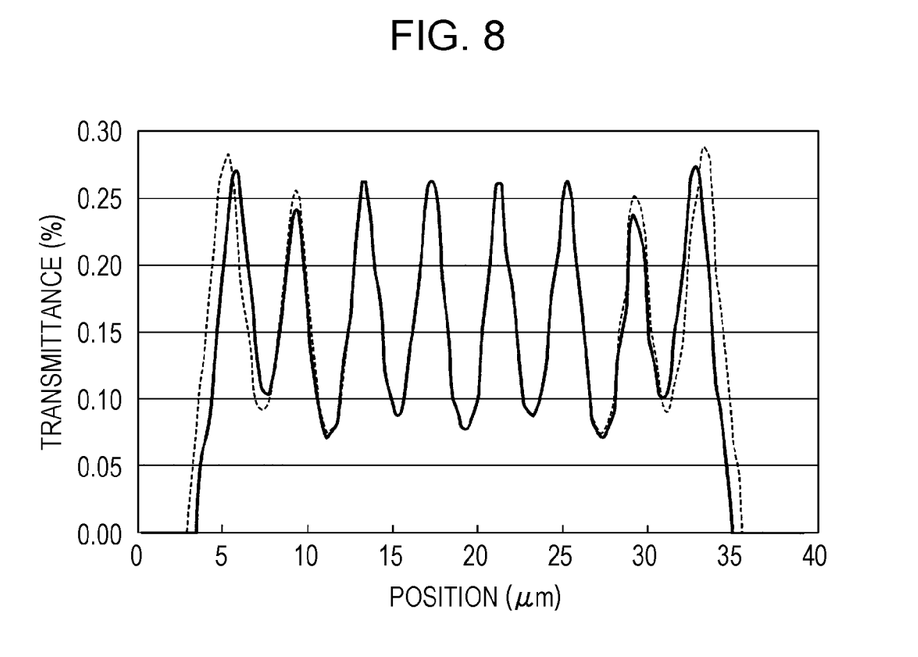
FIG. 8 illustrates a state that light transmittance is changed when a width of openings on both ends is changed.

FIG. 8 illustrates a simulation result showing transmittance distribution on each position in the sub pixel. In FIG. 8, a horizontal axis indicates a position [μm] in the sub pixel and a vertical axis indicates transmittance [%]. A graph expressed by a solid line indicates transmittance distribution in the liquid crystal device of the embodiment in which the width S1 of the opening positioned on the outermost part is 4 μm, the width S2 of the rest of the openings is 4.5 μm, and the width L of the electrode parts is 3.5 μm. A graph expressed by a dotted line indicates transmittance distribution in a liquid crystal device of a comparison example in which the width S of all openings is 4.5 μm and the width L of electrode parts is 3.5 μm. Here, in this simulation, a voltage applied to the liquid crystal layer was set to be a constant halftone voltage.

In the case of the comparison example, a peak showing the maximum transmittance is higher in the outermost part than that in the central part, and thus brightness increases faster in the outermost part even though the same voltage is applied. In contrast, in the case of the embodiment, it was understood that the height of a peak in the outermost part became close to the height of a peak in the central part because the width S1 of the opening positioned on the outermost part was decreased to be 4 μm, and thus even transmittance distribution could be obtained over the entire region.

In the simulation shown in FIG. 8, the voltage applied to the liquid crystal layer was set to be constant. On the other hand, in FIG. 9, the maximum luminance (the maximum transmittance) in each width of the openings was obtained by changing an applied voltage. The horizontal axis of FIG. 9 indicates the width [μm] of the opening and the vertical axis indicates the maximum luminance [relative value]. The maximum luminance indicated by the vertical axis is expressed by a relative value which is obtained in a condition that the maximum luminance is set to be 1 in a comparison example in which the width S of all openings is set to be 4.5 μm.

Figure 9:
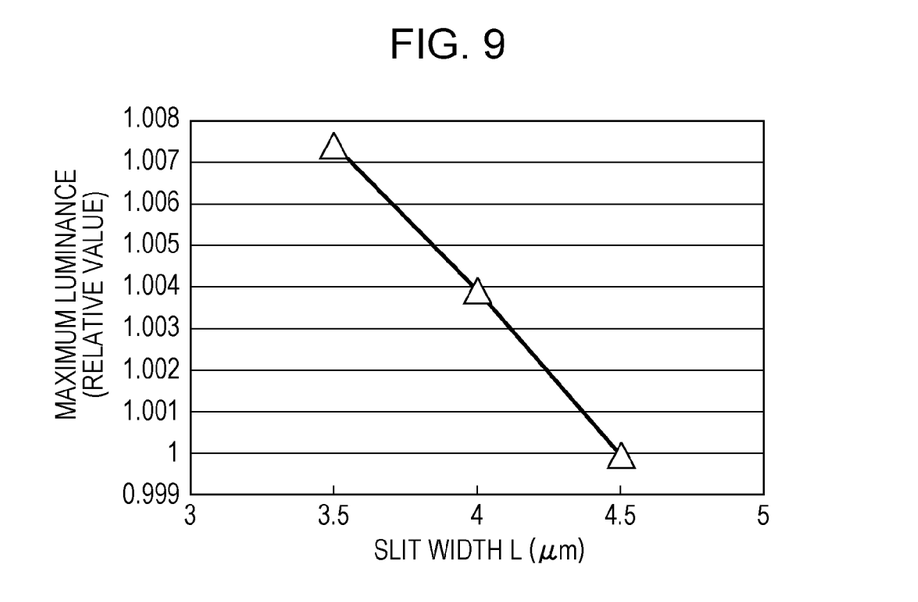
FIG. 9 is a graph showing a relationship between the width of the openings on the both ends and the maximum luminance.

It was understood that the maximum luminance could be improved by setting the width of the opening positioned on the outermost part to be smaller than that of other openings such that the opening positioned on the outermost part was 4 μm and the width of other openings was 3.5 μm.

The widths of the electrode parts and the openings are commonly set to be 2 μm to 6 μm, but the above-described result does not depend on the width of the electrode parts or the openings at least in this range.

Figure 10:
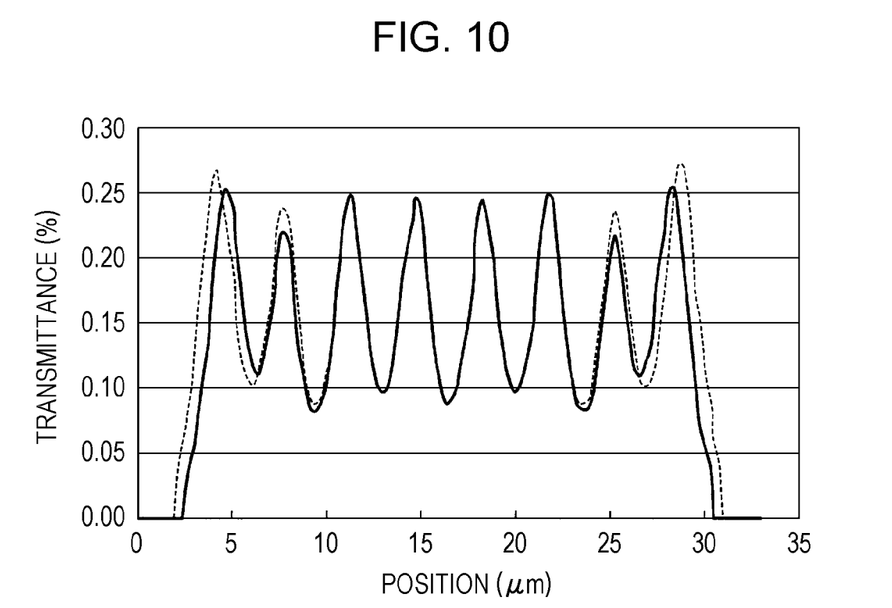
FIG. 10 illustrates a state that light transmittance is changed when conditions (width of openings, width of electrode parts) are changed from the state in FIG. 8.

FIG. 10 illustrates a simulation result showing transmittance distribution when the width S of the opening was set to be 4 μm and the width L of the electrode part was set to be 3 μm. A graph expressed by a solid line indicates transmittance distribution obtained when the width S1 of the opening positioned on the outermost part was 3.5 μm and the width S2 of the rest of the openings was 4 μm. A graph expressed by a dotted line indicates transmittance distribution obtained when the width S of all of the openings was 4 μm.

In this case as well, it was understood that even transmittance distribution could be obtained over the entire region as is the case with the result of FIG. 8.

Figure 11:
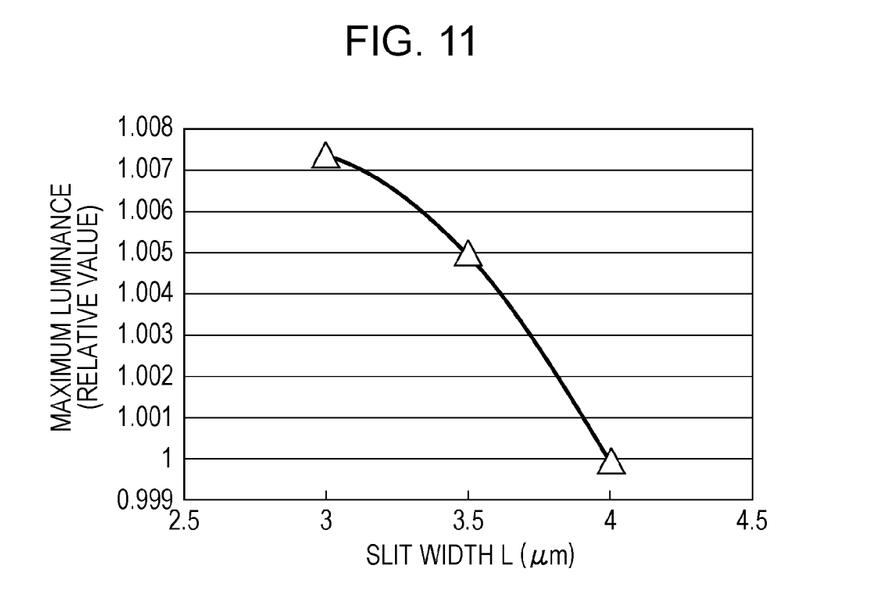
FIG. 11 is a graph showing a relationship between the width of the openings on both ends and the maximum luminance while corresponding to the state of FIG. 10.

FIG. 11 illustrates the maximum luminance obtained by changing the applied voltage in the simulation condition of FIG. 10.

In this case as well, it was understood that the maximum luminance could be improved by setting the width of the opening positioned on the outermost part to be smaller than that of other openings, as is the case with the result of FIG. 9.

As described above, according to the liquid crystal device 1 of the embodiment, the width of the opening 23a positioned on the outermost part in the common electrode 21 of each sub pixel is set to be smaller than the width of other openings 23b. As a result, evenness of light transmittance in the sub pixel is improved and unevenness in brightness in the sub pixel can be reduced. Accordingly, a liquid crystal device which has a superior visual angle property and can perform bright display can be realized. Further, the width S1 [μm] of the opening 23a positioned on the outermost part in the sub pixel and the width S2 [μm] of the rest of the openings 23b are set to satisfy S2−S1≥0.5, enabling stable manufacturing in the manufacturing process and being able to securely provide advantages of the embodiment.

[Another Embodiment]

Another embodiment will now be described with reference to FIGS. 12 and 13.

The basic configuration of a liquid crystal device of the other embodiment is same as that of the above described embodiment except for the electrode configuration.

Figure 12:
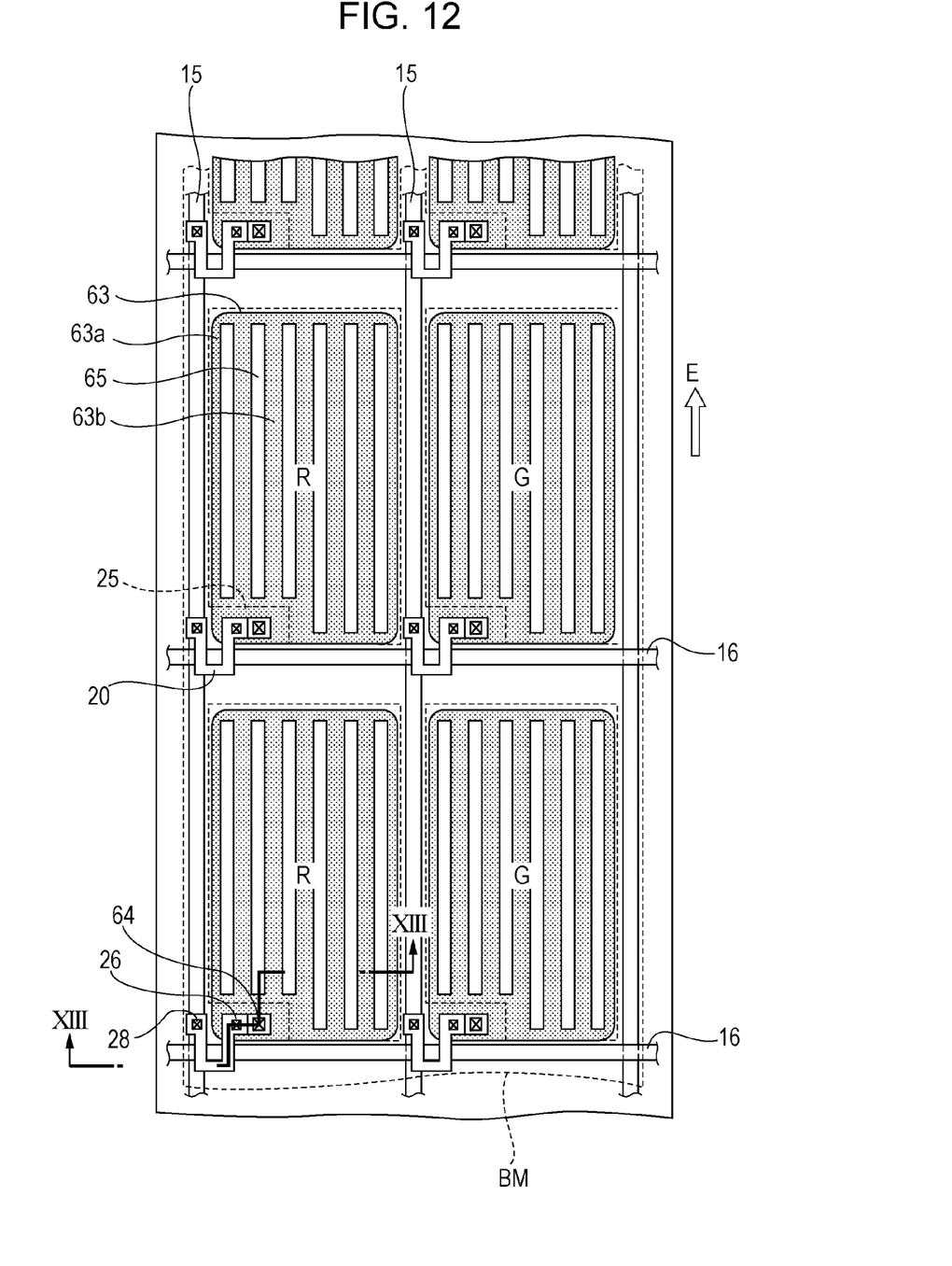
FIG. 12 is a plan view showing a pixel constituting a display unit of a liquid crystal device according to another embodiment.

FIG. 12 is a plan view showing a pixel constituting a display unit of the liquid crystal device of the other embodiment. FIG. 13 is a sectional view taken along XIII-XIII line of FIG. 12. In FIGS. 12 and 13, configuration elements common to those of FIGS. 4 and 5 are given the same reference characters and the description thereof is omitted.

Figure 13:
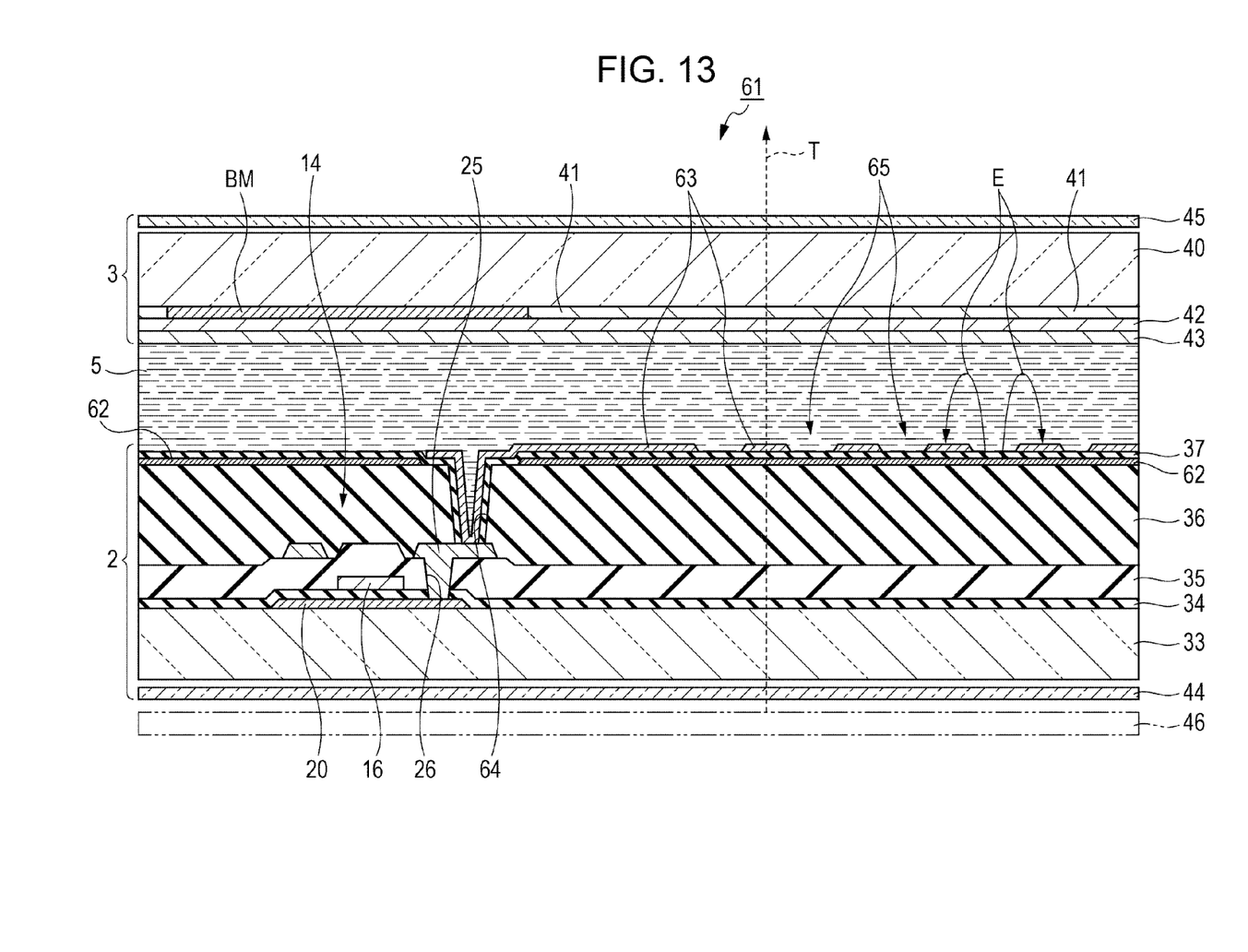
FIG. 13 is a sectional view taken along XIII-XIII line of FIG. 12.

In a liquid crystal device 61 of the other embodiment, a positional relationship of upper and lower electrodes is opposite to that in the embodiment described first, such that a common electrode 62 is formed on the lower layer side and a pixel electrode 63 is formed on the upper layer side as shown in FIG. 13. Specifically, the common electrode 62 is formed on the second interlayer insulation film 36 and the third interlayer insulation film 37 is formed to cover the common electrode 62. The pixel electrode 63 having a plurality of openings 65 is formed on the third interlayer insulation film 37. A point that a relay electrode 25 electrically connected with the drain region of the TFT 14 is provided is same as that of the embodiment described first. However, in the other embodiment, the pixel electrode 63 which is positioned on the uppermost layer of the TFT array substrate 2 is electrically connected with the relay electrode 25 through a pixel electrode contact hole 64 which penetrates the third interlayer insulation film 37 and the second interlayer insulation film 36.

In the case of the other embodiment, the common electrode 62 is provided over all of the sub pixels and thus the common electrode 62 is not divided for every sub pixel unlike the embodiment described first. Therefore, a common electrode line 22 in the embodiment described first is not provided in the other embodiment as shown in FIG. 12. In order to prevent an occurrence of short-circuiting between the pixel electrode 63 and the common electrode 62 in a part of the pixel electrode contact hole 64, an opening is formed on a part corresponding to the pixel electrode contact hole 64 and a part around the part corresponding to the pixel electrode contact hole 64, in the common electrode 62. Only these are the different points as a plane pattern of the sub pixel.

As a feature of the other embodiment, a plurality of long and thin openings 65 are formed on the pixel electrode 63 in each sub pixel region in the extending direction of the scanning line 16 with a predetermined interval, as shown in FIG. 12. Further, each of the openings 65 extends in approximately parallel with the extending direction of the data line 15 and the plurality of openings 65 are arranged in approximately parallel with each other. By providing the plurality of openings 65 to the pixel electrode 63, the pixel electrode 63 obtains a plurality of long and thin electrode parts 63a and 63b. Among the plurality of electrode parts 63a and 63b, the width (dimension in the short-side direction), in the alignment direction of the electrode parts 63a and 63b (extending direction of the scanning line), of the electrode part 63a which is positioned on the outermost side is set to be smaller than the width (dimension in the short-side direction), in the alignment direction, of the electrode parts 63b other than the electrode part 63a.

In the case of the other embodiment, when the width of the electrode part 63a positioned on the outermost side is set to be L1 [μm] and the width of the rest of the electrode parts 63b is set to be L2 [μm], L2−L1≥0.5 is satisfied. Specifically, the width L1 of the electrode part 63a positioned on the outermost part is 3 μm and the width L2 of the rest of the electrode parts 63b is 3.5 μm, for example. Further, the width S of the openings 65 is 4.5 μm and is constant.

In the embodiment described first, when the first electrode (lower layer side electrode) is set to be the pixel electrode, and the second electrode (upper layer side electrode) is set to be the common electrode, the width of the opening positioned on the outermost part of the common electrode in each sub pixel is set to be smaller than the width of other openings. On the other hand, in a case where the first electrode (lower layer side electrode) is set to be the common electrode 62 and the second electrode (upper layer side electrode) is set to be the pixel electrode 63 as the other embodiment, such configuration that the width of the electrode part 63a positioned on the outermost part of the pixel electrode 63 in each sub pixel is set to be smaller than the width of the rest of the electrode parts 63b is considered equivalent to the configuration of the embodiment described first. Accordingly, by setting the width of the electrode part 63*a* positioned on the outermost part of the pixel electrode 63 in each sub pixel to be smaller than the width of the rest of the electrode parts 63*b*, evenness of light transmittance in the sub pixel is improved and unevenness in brightness in the sub pixel can be reduced. Thus, the same advantageous effect as that of the embodiment described first can be obtained in the other embodiment.

[Electronic Apparatus]

An electronic apparatus according to sill another embodiment will now be described.

The electronic apparatus of the embodiment is an example to which the liquid crystal device of the embodiments described above is applied to a liquid crystal display unit of a mobile phone.

Figure 14:
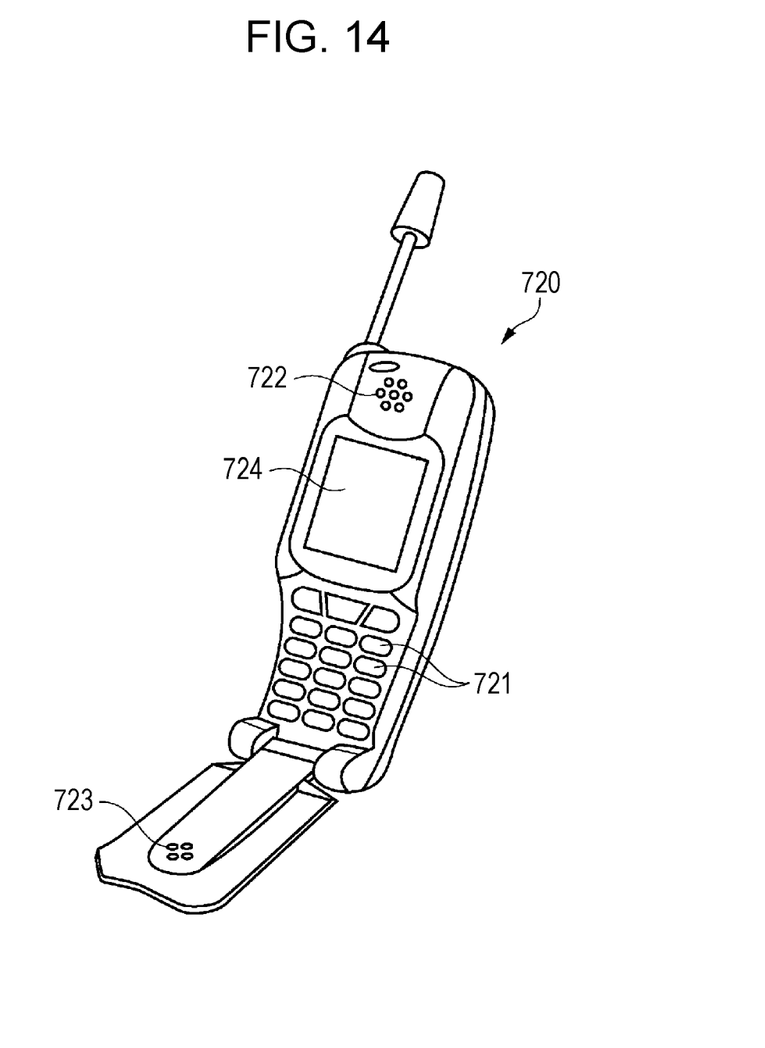
FIG. 14 is a perspective view showing an electronic apparatus of still another embodiment.

FIG. 14 is a perspective view showing the configuration of a mobile phone. As shown in FIG. 14, this mobile phone 720 includes a liquid crystal display unit 724, in which the liquid crystal device of the above described embodiments is employed, as well as a plurality of operation buttons 721, an ear piece 722, and a mouthpiece 723.

According to the embodiment, an electronic apparatus which can perform bright liquid crystal display can be provided because it includes the liquid crystal device of the above described embodiments.

The technical scope is not limited to the above described embodiments, but various alterations can be made within the scope. For example, the above described embodiments show the opening which is surrounded by the electrode so as to have a closed shape, as the example of the opening formed in the second electrode. However, the opening may have a shape of which one end is opened. That is, the second electrode may have a comb-teeth shape. Further, in the example of the above described embodiments, the extending direction of the opening is parallel with the extending direction of the data line (the longitudinal direction in FIGS. 4 and 12). However, the extending direction of the opening may be parallel with the extending direction of the scanning line (the lateral direction in FIGS. 4 and 12). In addition, as for specific configurations of the respective constituent elements constituting the liquid crystal device, not only the configuration shown in the above described embodiments but also the configuration which is arbitrarily altered may be employed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A display device, comprising:
a first substrate and a second substrate, the first substrate including:
a data line and a scanning line arranged intersecting with each other;
a plurality of pixels arranged in a matrix, each of which includes a switching element that is electrically connected to the data line and the scanning line;
a first electrode that is electrically connected to the switching element; and
a second electrode that overlaps the first electrode; and
a liquid crystal layer that is held between the first substrate and the second substrate;
wherein the liquid crystal layer is controlled by an electric field between the first electrode and the second electrode,
wherein the second electrode includes a plurality of openings that extend in parallel with each other,
wherein an extending direction of the openings is parallel to the data line and an alignment direction of the openings is parallel to the scanning line,
wherein each of the openings has a constant width and extends in a straight line,
wherein the openings include:
outermost openings that are positioned on an outermost side in the alignment direction in a region corresponding to a pixel, each of the outermost openings having a first width; and
middle openings that are the openings other than the outermost openings, each of the middle openings having a second width,
wherein the first width is smaller than the second width at the same corresponding position in the extending direction, and
wherein one side of the first electrode extending in the extending direction is positioned on an outer side in the alignment direction relative to one side of one of the outermost openings, which extends in the extending direction and is parallel and adjacent to the one side of the first electrode.

2. The display device according to claim 1, wherein, when the first width is set to S1 μm and the second width is set to S2 μm, and S2−S1≥0.5 is satisfied.

3. The display device according to claim 1, wherein the area of each of the outermost openings is different from the area of each of the middle openings.

4. The display device according to claim 1, wherein the area of each of the outermost openings is smaller than the area of each of the middle openings.

5. The display device according to claim 1, wherein the first electrode is disposed to cover a region corresponding to a respective pixel.

6. The display device according to claim 1, wherein the second electrode is a solid-type common electrode disposed to cover regions corresponding to all pixels.

7. The display device according to claim 1, wherein the second electrode is divided into a plurality of portions each corresponding to a region of a respective pixel.

8. The display device according to claim 1, wherein the outermost openings overlap the first electrode in a plan view.

* * * * *